US008209441B1

(12) United States Patent
Brockway et al.

(10) Patent No.: US 8,209,441 B1
(45) Date of Patent: Jun. 26, 2012

(54) ON-LINE STATUS DETECTION FOR HOST-BASED HEADSET APPLICATIONS

(75) Inventors: Richard T. Brockway, Felton, CA (US);
Terry A. Junge, Scotts Valley, CA (US);
Nirmala Ganapathy, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 2039 days.

(21) Appl. No.: 10/735,083

(22) Filed: Dec. 12, 2003

(51) Int. Cl.
*G06F 3/00* (2006.01)
*H04M 1/24* (2006.01)
*H04M 3/08* (2006.01)
*H04M 3/22* (2006.01)

(52) U.S. Cl. ...................................... 710/15; 379/32.01
(58) Field of Classification Search ...................... 710/15
See application file for complete search history.

(56) References Cited

U.S. PATENT DOCUMENTS

| 5,210,791 | A | 5/1993 | Krasik |
| 5,359,647 | A | 10/1994 | Regen et al. |
| 6,731,751 | B1* | 5/2004 | Papadopoulos .......... 379/399.01 |
| 6,845,408 | B1* | 1/2005 | Lemke et al. ................... 710/18 |
| 7,110,799 | B1* | 9/2006 | Willins et al. .............. 455/575.2 |
| 2001/0019955 | A1* | 9/2001 | Henderson ..................... 455/426 |
| 2001/0020975 | A1* | 9/2001 | Kerai et al. ................ 348/14.01 |
| 2002/0064276 | A1* | 5/2002 | Winegar ...................... 379/430 |
| 2003/0016816 | A1* | 1/2003 | Estroff .......................... 379/430 |
| 2003/0165230 | A1* | 9/2003 | Reuss ..................... 379/265.02 |
| 2003/0197620 | A1* | 10/2003 | Radousky ..................... 340/635 |
| 2004/0202339 | A1* | 10/2004 | O'Brien, Jr. et al. ......... 381/312 |
| 2005/0069121 | A1* | 3/2005 | Faruque et al. ............... 379/225 |

OTHER PUBLICATIONS

BTTS (BAR Tech Telecom Services), Meridian i2050 Software Telephone, May 19, 2003, (http://web.archive.org/web/20030519220111/http://www.btts.com/ds_phones_i2050.htm).*
Nortel Networks, i2050 Software Phone User Guide, Oct. 2003, (http://www116.nortelnetworks.com/docs/bvdoc/i2050/p0608404_2.00.pdf).*
http://www.algosolutions.com/pdf/AN-0606.pdf, Application Note: Jun. 2006.

* cited by examiner

*Primary Examiner* — Chun-Kuan Lee
*Assistant Examiner* — Brooke Dews
(74) *Attorney, Agent, or Firm* — Chuang Intellectual Property Law

(57) ABSTRACT

Systems and methods for automatic detection and signaling of an on-line status of a headset or other audio transmit/receive system used with telephony and/or other multimedia application software running on personal computers or other processor-based hosts are disclosed. The system generally includes a headset to communicate with the host executing the application software such as a softphone utilizing the headset via a port of the host, an on-line status detector in communication with the host via the port to detect the on-line status based on detecting a request for transmit data at the port and based on a signaling protocol associated with the port and independent of the application software, and an on-line indicator selectively activated by the on-line status detector. The request for transmit data may be detected by the opening or presence of a transmit channel opened by the host on the port.

34 Claims, 4 Drawing Sheets

ON-LINE STATUS DETECTION FOR HOST-BASED HEADSET APPLICATIONS

BACKGROUND OF THE INVENTION

1. Field of the Invention

The present invention relates generally to telephony and multimedia applications using personal computers or other processor-based hosts. More specifically, systems and methods for automatic detection and signaling of the on-line (or hook switch) status of a headset used with telephony and/or other multimedia application software running on personal computers or other processor-based hosts are disclosed.

2. Description of Related Art

Telephone or computer headsets are used extensively, often by operators, customer service agents such as in call centers, and/or other professionals who frequently use telephones or computer telephony and/or other multimedia applications. The headset is typically connected to a host device, i.e., the telephone or the computer, running a telephony (softphone) or other multimedia application, via a port such as a USB port and optionally via a connector such as a Quick Disconnect™ (QD) connector to provide added convenience and operability. The QD connector may be a mechanical interconnect positioned between the headset and the host device or between the headset and a headset adapter connected to the host device. The user may simply and quickly disconnect the headset from the host device at the QD connector rather than at the host device so that the headset user does need not to remove the headset and can continue to wear the headset even when the user moves away from the host device. Thus, while the user is at the workstation, office, or cubicle, the user may often be wearing the headset for convenience but may or may not be currently using the headset, i.e., the headset may or may not be on-line, i.e., in an off-hook state.

Headsets are not only used with telephony systems but are widely used in a variety of computer and other multimedia applications, particularly with the convergence of computer and telephony technologies. Examples of headsets designed to connect to computers or other processor-based hosts include those adapted for various applications such as computer telephony (generally referred to as softphones), voice recognition, language or speech learning, audio listening for music, training, video, etc., and/or video game systems.

In certain circumstances, particularly in call centers and other office environments, it is useful to indicate to onlookers that the headset is in use, i.e., off hook or on-line. In particular, it would be desirable for the headset to automatically visually indicate to onlookers that the headset user is currently using the headset and should not be disturbed or interrupted. For example, a softphone application may indicate that a telephone call is in session via a display on a video display monitor associated with the host device.

However, such an indication is generally application-specific and other applications may not provide for such indication of the off-hook or on-line status to onlookers. In addition, different applications would typically provide different on-line status indications and such non-uniformity may make it difficult for an onlooker to quickly tell from the various information displayed on the video monitor that the headset is indeed on-line. To unify such display of the on-line status indicator on a video monitor would not only require all softphone vendors but vendors of all other multimedia applications that use the headset to standardize their on-line status video display.

Thus, what is needed is a system and method to automatically detect and indicate hook switch or on-line headset status to onlookers in the vicinity of the user. Ideally, the system and method provide a same on-line indicator regardless of the application being used with the headset.

SUMMARY OF THE INVENTION

Systems and methods for automatic detection and signaling of the on-line (or hook switch) status of a headset used with telephony and/or other multimedia application software running on personal computers or other processor-based hosts are disclosed. It should be appreciated that the present invention can be implemented in numerous ways, including as a process, an apparatus, a system, a device, or a method. Several inventive embodiments of the present invention are described below.

The headset or other audio transmit and receive system generally includes a headset configured to communicate with a processor-based host executing an application software such as a softphone application software utilizing the headset via a port such as a USB port of the host, an on-line status detector in communication with the host via the port to detect the on-line status based on detecting request for transmit data at the port and based on a signaling protocol associated with the port independent of the application software, and an on-line indicator such as an LED selectively activated by the on-line status detector. The request for transmit data may be detected by the opening or the presence of a transmit channel opened by the host on the port. A headset adapter may be provided to interface between the headset and the host via the port and include the on-line status detector. The on-line indicator may be remote and/or may be disposed on the headset adapter and/or on the headset, e.g., on an end of a microphone boom.

A method for detecting on-line status of a headset (or other audio transmit/receive set) generally includes monitoring to detect request for transmit data from a processor-based host on a port of the host, the headset being used with execution of an application software on the host and in communication with the host via the port, the request for transmit data from the host being based on a signaling protocol associated with the port and independent of the application software, activating an on-line indicator associated with the headset to indicate an on-line status of the headset when request for transmit audio data associated are detected at the port, and deactivating the on-line indicator to indicate an off-line status of the headset in absence of detection of request for transmit audio data at the port.

Utilizing a USB port merely for illustrative purposes, the host opens the transmit channel on the USB port using standardized USB communications signaling protocol. The on-line status detector detects the standardized USB communications signaling from the host to the USB port to open the transmit channel. The on-line status detector thus take advantage of the signaling protocol used by the host to control and manage the USB port, independent of and regardless of the particular host application software being executed by the host. By relying upon a standardized signaling from the host to the port, the on-line status detector is able to detect the on-line status of the headset without reliance upon signaling directly generated by the particular application software being executed by the host.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Systems and methods for automatic detection and signaling of the on-line (or hook switch) status of a headset used with telephony and/or other multimedia application software running on personal computers or other processor-based hosts are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

Figure 1:
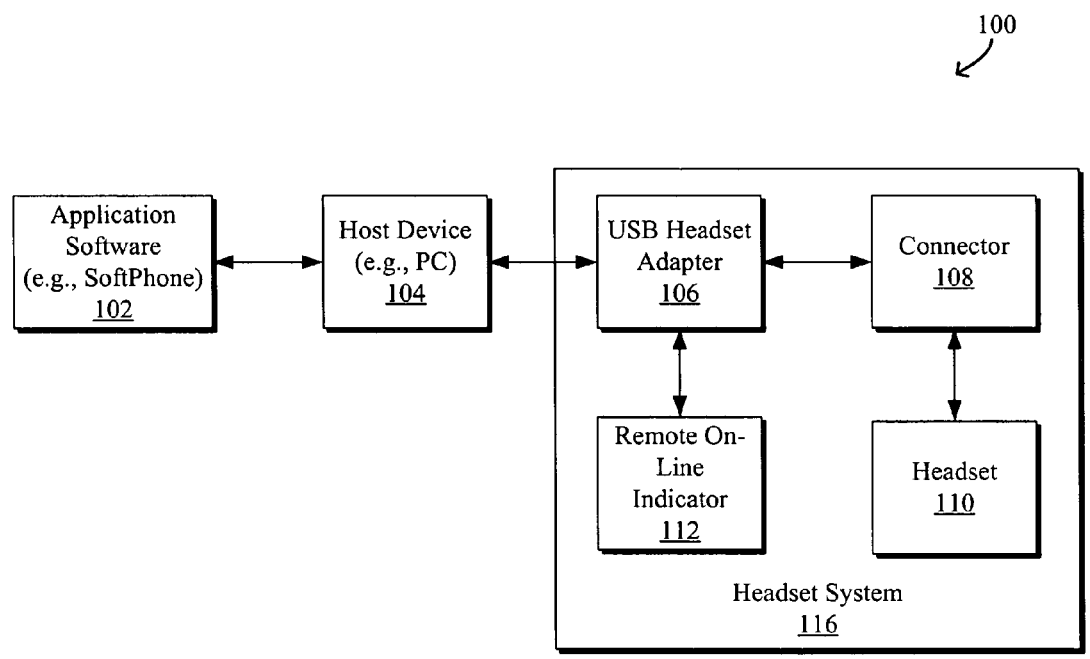
FIG. 1 is a block diagram of an illustrative embodiment of a host-based audio system utilizing an on-line status detector of a headset adapter for detecting the on-line status of a headset.
Figure 2:
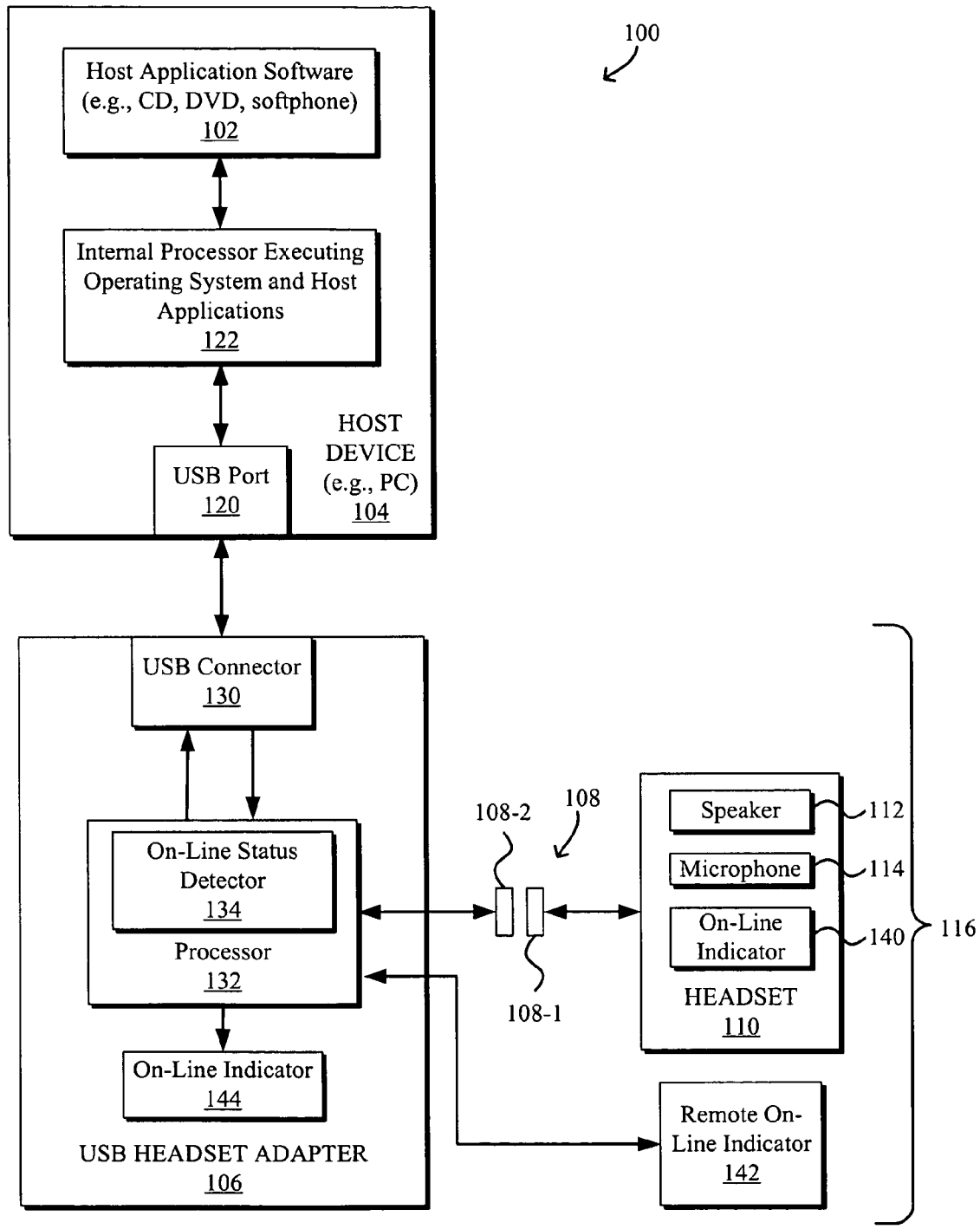
FIG. 2 is a block diagram illustrating the system of FIG. 1 in more detail.

FIG. 1 is a block diagram of an illustrative embodiment of a host-based audio system 100 utilizing an on-line status detector for detecting and indicating the on-line status of a headset (or handset) system 116 and FIG. 2 is a block diagram illustrating the host-based audio system 100 of FIG. 1 in more detail. As shown, the headset 110 is connected to the host device 104 via an optional connector 108 and a headset adapter 106. Typically, the headset adapter 106 is a Universal Serial Bus (USB) headset adapter 106 to enable the headset 110 to connect to the host device 104 through a USB port of the host device 104. The optional connector 108 may be a quick disconnect (QD) device and preferably allows the headset user to quickly disconnect the headset 110 at the connector 108 rather than at the headset adapter 106 so that the user may easily and quickly disconnect the headset 110 from the host device 104 and leave the area without removing the headset 110. The optional connector 108 has a headset portion 108-1 that is connected to the headset 110 and an adapter portion 108-2 that is connected to the headset adapter 108. The headset portion 108-1 and the adapter portion 108-2 of the connector 108 are connected to and disconnected from each other so as to connect and disconnect the headset 110 and host device 104 and the headset adapter 106, respectively. It is noted that although the examples described herein utilize the connector 108 between the headset 110 and the adapter 106, as is preferred, the headset 110 may alternatively be directly connected to and disconnected from the headset adapter 106. In particular, the digital signaling taking place between the headset adapter 106 and the host device 104 for the automatic detection of the on-line status of the headset 110 is similar regardless of whether the connector 108 is provided.

As noted, the headset 110 is preferably in communication with the host device 104 via the USB headset adapter 106 connected to the USB port of the host device 104. However, any other suitable communication port may be used for connecting the headset 110 to the host device 104. In addition, although wired connections are typically and preferably employed, such as between the USB headset adapter 106 and the host device 104 and between the adapter 106 and the headset 110, wireless connections may alternatively or additionally be employed. For example, the headset 110 may be a cordless headset in wireless communication with the adapter 106 using, e.g., RF technology. The headset 110 can be selectively on-line or off-line and thus be selectively in communication with host device 104. Thus, the term "connection" utilized herein generally refers to both wired and wireless connections.

The host device 104 is generally shown and described herein as a PC with a USB port 120 to which a USB headset adapter 106 is connected. However, the host device 104 may be any other suitable processor-based unit and the port connecting the headset adapter to the host may be any other suitable communications port, preferably a two-way communications port. In particular, the host device 104 may be any suitable processor-based device such as a personal computer (PC), a personal digital assistant (PDA), a digital music player (e.g., MP3 player), a video player (e.g., DVD player), a video game player, or a processor-based telephone. The host device 104 executes application software such as a telephony application software that uses the headset 110, for example, for receiving the user's voice as input through a transmit channel of the USB port and/or for outputting sounds to the user as output through a receive channel of the USB port. The headset adapter 106 is configured to detect when the host device 104 opens a transmit channel on the USB port (or other suitable port) and, in response, causes an on-line status indicator associated with the headset 110 to indicate the on-line status of the headset 110 as will be described in more detail below.

As shown, the host PC 104 includes an internal processor 122 such as a CPU that controls and manages hardware such as the USB port 120 and executes an operating system such as Microsoft Windows XP or Windows 2000 and various host application software 102. The use of the headset 110 via the USB port 120 may be requested by the host application software 102. For example, the host application software 102 may be a training application, voice recognition application, music or other audio player application, video game application, video player application, and/or softphone application. The term softphone application or softphone generally refers to a telephony application running on a PC or other processor-based host, typically with a graphical user interface displayed on a monitor rather than a physical dial pad.

When the internal processor 122 executes a host application software 102 that requests the use of the microphone 114 of the headset 110, the internal processor 122 turns on the microphone (transmit) channel on the USB port 120, e.g., by requesting to receive transmit data via the USB port 120. Such requests for transmit data by the internal processor 122 to the USB port 120 are defined by standardized USB signaling protocol, are well known and are independent of the specific application software 102 being executed. The internal processor 122 also turns off the microphone (transmit) channel on the USB port 120 when the software application 102 on the PC no longer needs to use the microphone 114.

The requests for transmit data by the internal processor 122 to the USB port 120 is transmitted to the headset adapter 106 via a USB connector (plug) 130 and detected by an on-line status detector 134, preferably implemented as firmware in a processor 132 of the headset adapter 106. When the on-line status detector 134 detects the request by the host device 104 to turn on the microphone 114 on the USB port 120, the headset adapter processor 132 activates the on-line indicator associated with the headset 110. Similarly, when the on-line status detector 134 detects that the internal processor 122 has turned off the microphone (transmit) channel on the USB port 120, the firmware in the headset adapter processor 132 deactivates the on-line indicator associated with the headset 110. Thus the presence or absence of requests for transmit data by the internal processor 122 to the USB port 120 are detected by the on-line status detector 134 via the USB connector 130 and utilized to activate or deactivate the on-line indicator.

The on-line indicator is preferably a visual indicator that allows those around the headset user to quickly and easily tell when the headset 110 is on-line and thus helps to prevent onlookers from accidentally interrupting or disturbing the headset user when the headset is on-line. However, other indication mechanisms, e.g., audio, may be additionally or alternatively be utilized by the on-line indicator. The on-line status indicator may be provided as a headset on-line status indicator 142 on the headset 110, an adapter on-line status indicator 144 on the headset adapter 106, a connector on-line status indicator (not shown) on the headset connector 108, and/or a separate on-line status indicator 146. The headset on-line status indicator 142 may be provided at any suitable location on the headset 110 such as near a speaker 112 and/or near a microphone 114, for example, at an end of a microphone boom. The separate on-line status indicator 144 may be a remote on-line indicator located at any suitable remote location such as near or at an entrance to a headset user's workstation, office, or cubicle or on top of a video display monitor, etc.

In one embodiment, the on-line status indicator 140, 142, 144 may be a light emitting diode (LED) or other light emitting device that flashes or blinks or is continuously lit to indicate the on-line status of the headset 110 and is off to indicate the off-line status of the headset 110. As another example, the on-line status indicator may provide a red LED which when lit indicates an on-line status and a green LED which when lit indicates an off-line status of the headset. Preferably, when the headset 110 is only being used for receive data such as when the headset user is listening to music or other recording and transmit data is not requested by the application software 102 being executed, the on-line status detector 134 does not detect on-line status and thus the on-line indicator remains deactivated.

As an example, in the case of the softphone application 102, each time the softphone 102 goes off hook (on-line), the application software 102 requests the use of the microphone 114 and the internal processor 122 turns on the microphone channel on the USB port 120. The on-line status detector 134 of the headset adapter 106 detects that the microphone channel on the USB port 120 is turned on (e.g., transmit data is being requested) and in turn activates the on-line indicator, e.g., 140, 142, and/or 144. The on-line indicator remains activated until the on-line status detector 134 deactivates the on-line indicator when the on-line status detector 134 detects that the microphone channel on the USB port 120 is turned off (e.g., transmit data is no longer requested) by the internal processor 122 of the host device 104, i.e., when the softphone goes on hook (off-line). Thus the on-line indicator is activated when the host application software 102 is using the microphone 114 and is deactivated when the host application software 102 stops using the microphone 114.

In one embodiment, the on-line status detector 134 may monitor the USB port 120 via the USB connector 130 for the status of the transmit channel, e.g., by polling the transmission of communication packets from the USB port 120. Thus, when the transmit channel of the USB port 120 is opened, the on-line status detector 134 detects the change as a result of the polling. Any other suitable monitoring method may be employed.

As noted above, the host internal processor 122 opens the transmit channel on the USB port 120 using standardized USB communications signaling protocol which is in turn detected by the on-line status detector 134 of the headset system 116. In other words, the on-line status detector 134 detects the on-line status of the application software 102 being executed by the host device 104 by utilizing and examining the data that is inherent in the signaling from the host processor 122 to the USB port 120. By relying upon the signaling inherent in the data transmission from the host processor 122 to the USB port 120, the on-line status detector 134 can detect the on-line status by detecting the opening of a transmission channel in the USB port 120 regardless of the particular host application software 102 being executed by the host device 104.

Figure 3:
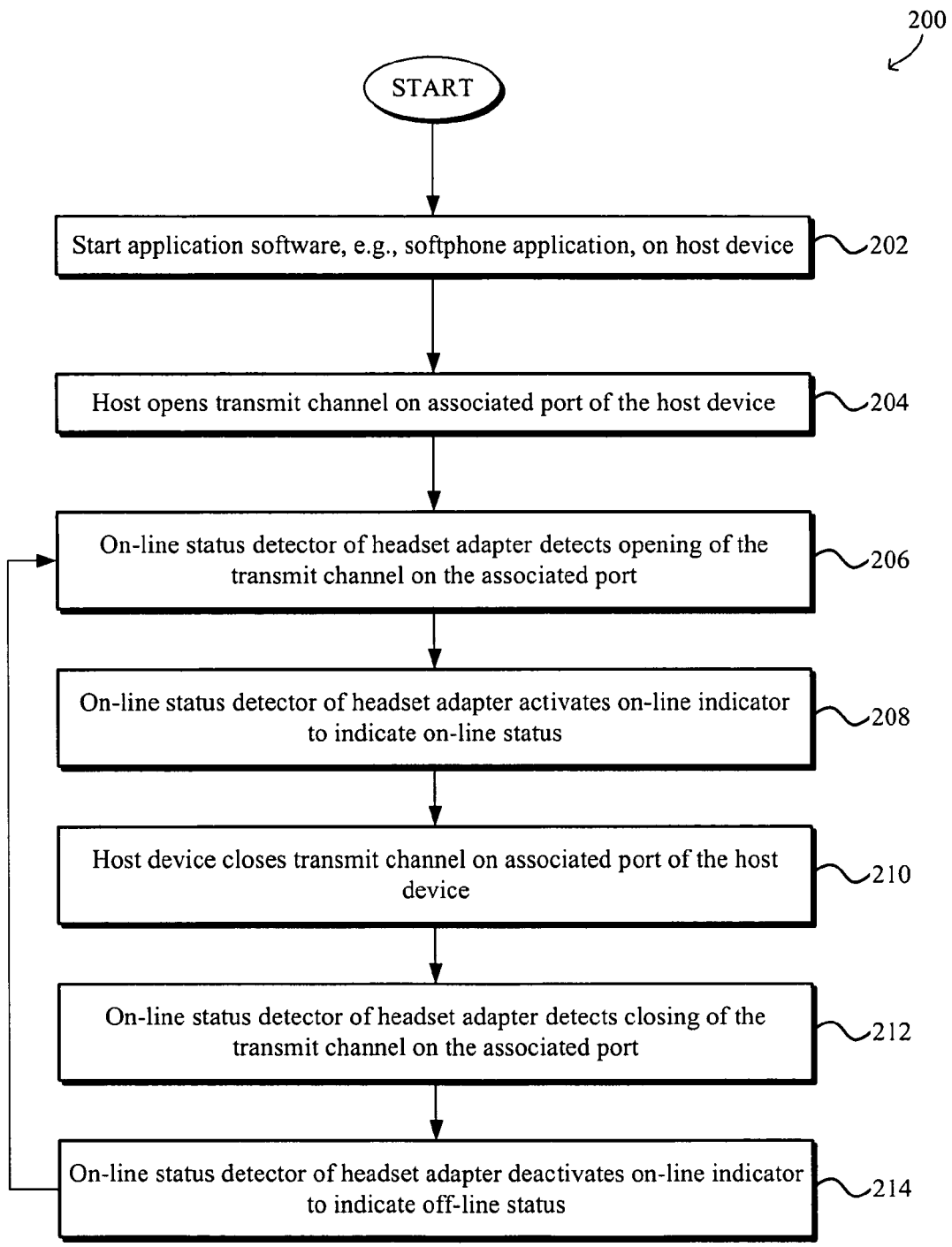
FIG. 3 is a flow chart illustrating an exemplary process for detecting and indicating the on-line status by the headset adapter.

FIG. 3 is a flow chart illustrating an exemplary process 200 for detecting and activating the on-line indicator by the headset adapter. It is noted that the adapter may be for any other suitable audio device such as a handset or other transmit/receive audio device. At block 202, the processor-based host device begins executing the host application software, e.g., softphone application. At block 204, the host device opens a transmit channel on an associated port of the host device with which the headset adapter is in communication. At block 206, the on-line status detector of the headset adapter detects the opening of the transmit channel on the associated port by the internal processor of the host device. The associated port is typically a digital port such as a USB port but may be any suitable digital port using any digital protocol that differentiates between transmit and receive data. For example, a custom sound card may be used where a transmit channel or request for transmit data from the internal processor of the host independent of the particular software application being executed can be detected by the headset adapter.

At block 208, the on-line status detector of headset adapter activates an on-line indicator to indicate on-line status of the headset. When application software no longer requests transmit data, e.g., when the telephone call is terminated on the softphone and/or when execution of the softphone application is terminated, the internal processor of the host device closes the transmit channel on the associated port of the host device at block 210. Upon detecting that the transmit channel on the associated port is closed by the on-line status detector of the headset adapter at block 212, the on-line status detector deactivates the on-line indicator to indicate off-line status at block 214. The process 200 then returns to block 206 to await detection by the on-line status detector of the opening of the transmit channel on the associated port.

Figure 4:
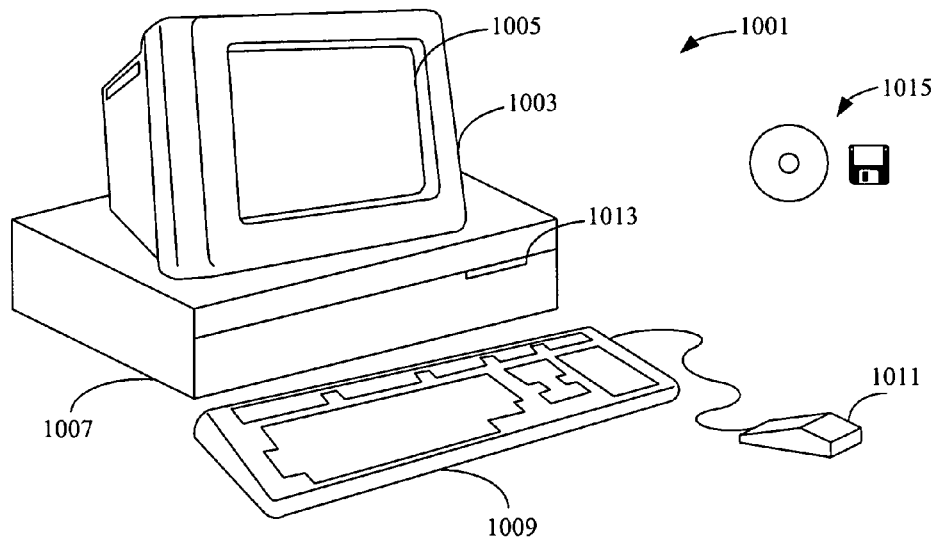
FIG. 4 illustrates an example of a computer system that can be utilized with the various embodiments of method and processing described herein.
Figure 5:
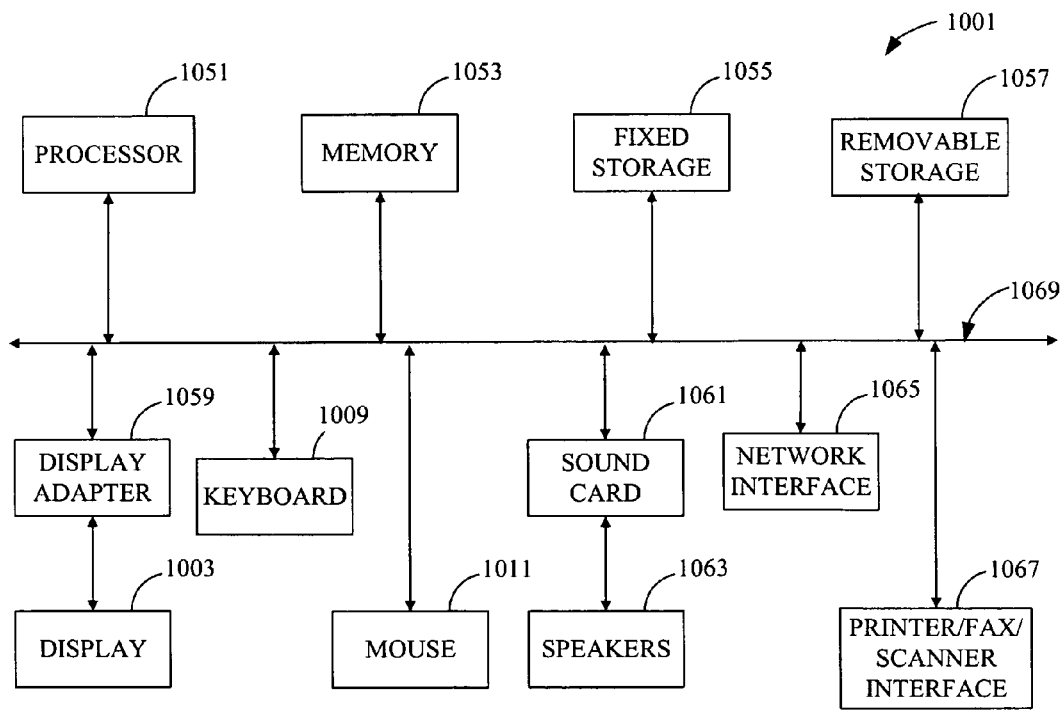
FIG. 5 illustrates a system block diagram of the computer system of FIG. 4.

FIGS. 4 and 5 illustrate a schematic and a block diagram, respectively, of an exemplary general purpose computer system 1001 suitable for executing software programs that implement the methods and processes described herein. The architecture and configuration of the computer system 1001 shown and described herein are merely illustrative and other computer system architectures and configurations may also be utilized.

The exemplary computer system 1001 includes a display 1003, a screen 1005, a cabinet 1007, a keyboard 1009, and a mouse 1011. The cabinet 1007 typically houses one or more drives to read a computer readable storage medium 1015, a system memory 1053, and a hard drive 1055 which can be utilized to store and/or retrieve software programs incorporating computer codes that implement the methods and processes described herein and/or data for use with the software programs, for example. A CD and a floppy disk 1015 are shown as exemplary computer readable storage media readable by a corresponding floppy disk or CD-ROM or CD-RW drive 1013. Computer readable medium typically refers to any data storage device that can store data readable by a computer system. Examples of computer readable storage media include magnetic media such as hard disks, floppy disks, and magnetic tape, optical media such as CD-ROM disks, magneto-optical media such as floptical disks, and specially configured hardware devices such as application-specific integrated circuits (ASICs), programmable logic devices (PLDs), and ROM and RAM devices.

Further, computer readable storage medium may also encompass data signals embodied in a carrier wave such as the data signals embodied in a carrier wave carried in a network. Such a network may be an intranet within a corporate or other environment, the Internet, or any network of a plurality of coupled computers such that the computer readable code may be stored and executed in a distributed fashion.

The computer system 1001 comprises various subsystems such as a microprocessor 1051 (also referred to as a CPU or central processing unit), system memory 1053, fixed storage 1055 (such as a hard drive), removable storage 1057 (such as a CD-ROM drive), display adapter 1059, sound card 1061, transducers 1063 (such as speakers and microphones), network interface 1065, and/or printer/fax/scanner interface 1067. The computer system 1001 also includes a system bus 1069. However, the specific buses shown are merely illustrative of any interconnection scheme serving to link the various subsystems. For example, a local bus can be utilized to connect the central processor to the system memory and display adapter.

Methods and processes described herein may be executed solely upon CPU 1051 and/or may be performed across a network such as the Internet, intranet networks, or LANs (local area networks) in conjunction with a remote CPU that shares a portion of the processing.

While the preferred embodiments of the present invention are described and illustrated herein, it will be appreciated that they are merely illustrative and that modifications can be made to these embodiments without departing from the spirit and scope of the invention. Thus, the invention is intended to be defined only in terms of the following claims.

What is claimed is:

1. An audio transmit and receive system, comprising:
    an audio transmit and receive set configured to transmit audio data to and receive audio data from a processor-based host executing an application software utilizing the audio transmit and receive set, the audio transmit and receive set being further configured to communicate with the host via a port of the host;
    an on-line indicator associated with the audio transmit and receive set to selectively indicate an on-line status of the audio transmit and receive set when transmit audio data associated with the application software are requested by the host; and
    an on-line status detector in communication with the host via the port, the on-line status detector being configured to detect the on-line status based on detecting request for transmit data at the port, the detecting and the request being based on a signaling protocol associated with the port independent of the application software, the on-line status detector being further configured to activate the on-line indicator when the on-line status is detected and deactivate the on-line indicator when the on-line status is not detected.

2. The system of claim 1, further comprising an audio transmit and receive set adapter configured to interface between the audio transmit and receive set and the host via the port, the audio transmit and receive set adapter including the on-line indicator.

3. The system of claim 2, wherein the on-line indicator is disposed on the audio transmit and receive set adapter.

4. The system of claim 2, wherein the audio transmit and receive set is configured to wirelessly communicate with the audio transmit and receive set adapter.

5. The system of claim 1, wherein the audio transmit and receive set is selected from a headset and a handset.

6. The system of claim 1, wherein the audio transmit and receive set is a headset having a microphone boom and wherein the on-line indicator is disposed on the microphone boom.

7. The system of claim 1, wherein the port is a USB port.

8. The system of claim 7, wherein the on-line status detector detects the online status based on detection of the host opening a transmit channel on the USB port.

9. The system of claim 7, wherein the on-line status detector is configured to deactivate the on-line indicator upon detection of an off-line status based on absence of a transmit channel on the USB port.

10. The system of claim 1, wherein the on-line indicator is an LED.

11. The system of claim 1, wherein the application software is a softphone application software.

12. The system of claim 1, wherein the on-line indicator is a remote on-line status indicator in communication with the on-line status detector.

13. A headset system, comprising:
    a headset configured to communicate with a processor-based host executing an application software utilizing the headset via a port of the host;
    a headset adapter configured to interface between the headset and the host via the port and to detect a transmit channel opened by the host on the port based on a signaling protocol associated with the port independent of the application software; and
    an on-line indicator in communication with the headset adapter, the headset adapter being further configured to activate the on-line indicator when the transmit channel is detected and to deactivate the on-line indicator in absence of detection of the transmit channel.

14. The system of claim 13, wherein the on-line indicator is disposed on the headset adapter.

15. The system of claim 13, wherein the headset is configured to wirelessly communicate with the headset adapter.

16. The system of claim 13, wherein the headset includes a microphone boom and wherein the on-line indicator is disposed on the microphone boom.

17. The system of claim 13, wherein the port is a USB port.

18. The system of claim 17, further comprising an on-line status detector configured to detect an on-line status based on detection of the host opening a transmit channel on the USB port.

19. The system of claim 17, wherein the on-line status detector is configured to deactivate the on-line indicator upon detection of an off-line status based on absence of a transmit channel on the USB port.

20. The system of claim 13, wherein the on-line indicator is an LED.

21. The system of claim 13, wherein the application software is a softphone application software.

22. The system of claim 13, wherein the on-line indicator is a remote on-line status indicator in communication with the on-line status detector.

23. A method for detecting on-line status of an audio transmit and receive set, comprising the steps of:
- monitoring to detect request for transmit data from a processor-based host on a port of the host, the audio transmit and receive set being used with execution of an application software on the host and in communication with the host via the port, the request for transmit data from the host being based on a signaling protocol associated with the port and independent of the application software;
- activating an on-line indicator associated with the audio transmit and receive set to indicate an on-line status of the audio transmit and receive set when request for transmit audio data associated are detected at the port; and
- deactivating the on-line indicator to indicate an off-line status of the audio transmit and receive set in absence of detection of request for transmit audio data at the port.

24. The method of claim 23, wherein the monitoring is performed by an online status detector of an audio transmit and receive set adapter, the adapter being configured to interface between the audio transmit and receive set and the host via the port.

25. The method of claim 24, wherein the on-line indicator is disposed on the audio transmit and receive set adapter.

26. The method of claim 24, wherein the audio transmit and receive set is configured to wirelessly communicate with the audio transmit and receive set adapter.

27. The method of claim 23, wherein the audio transmit and receive set is selected from a headset and a handset.

28. The method of claim 23, wherein the audio transmit and receive set is a headset having a microphone boom and wherein the on-line indicator is disposed on the microphone boom.

29. The method of claim 23, wherein the port is a USB port.

30. The method of claim 29, wherein the monitoring is based on detection of the host opening a transmit channel on the USB port.

31. The method of claim 29, wherein the deactivating is upon detection of an off-line status based on absence of a transmit channel on the USB port.

32. The method of claim 23, wherein the on-line indicator is an LED.

33. The method of claim 23, wherein the application software is a softphone application software.

34. The method of claim 23, wherein the on-line indicator is a remote on-line status indicator.

* * * * *